No. 699,908. Patented May 13, 1902.
W. BRANDON.
BAND CUTTER AND FEEDER FOR THRESHING MACHINES OR GRAIN SEPARATORS.
(Application filed Sept. 13, 1901.)
(No Model.) 3 Sheets—Sheet 1.
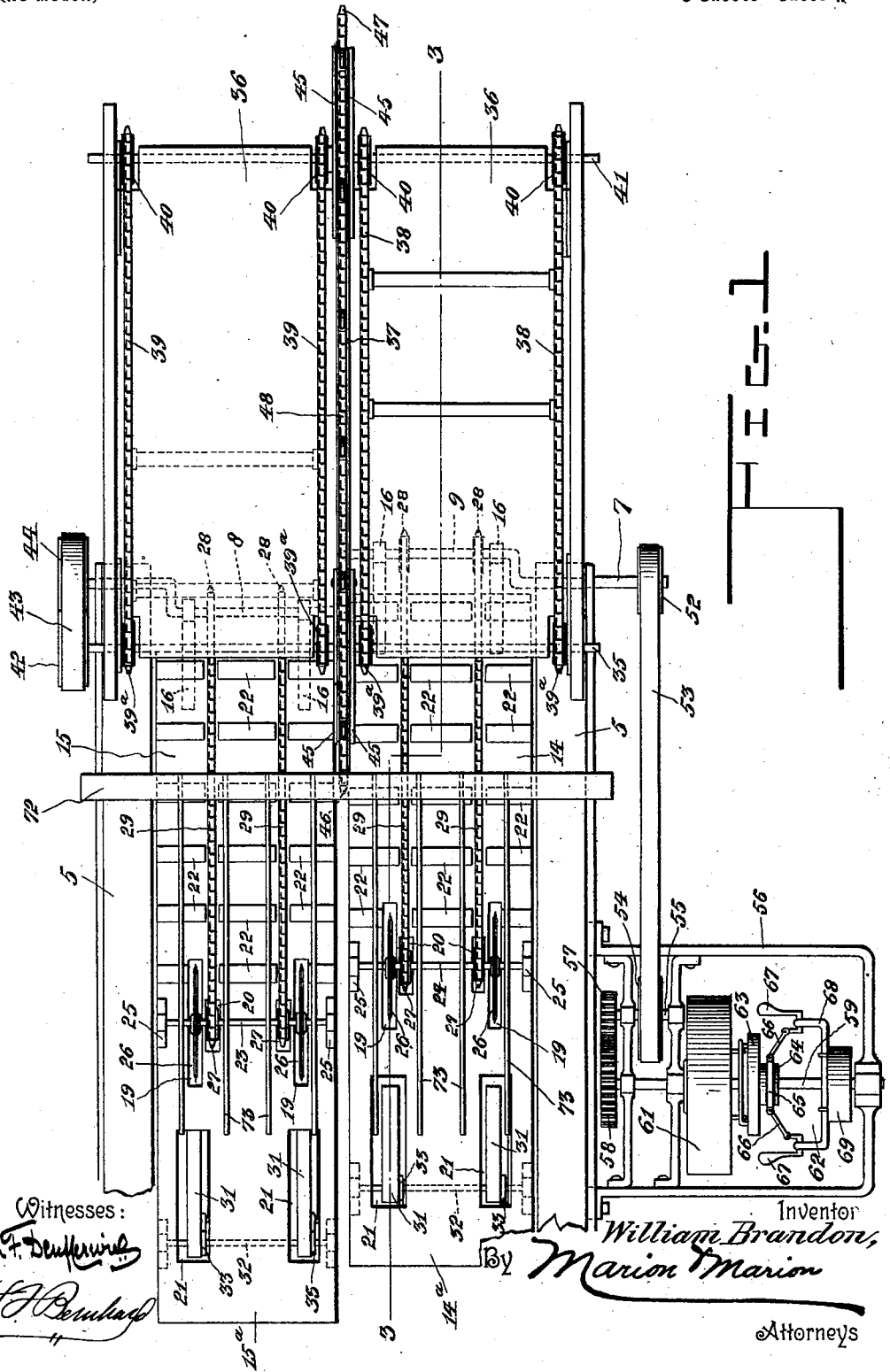

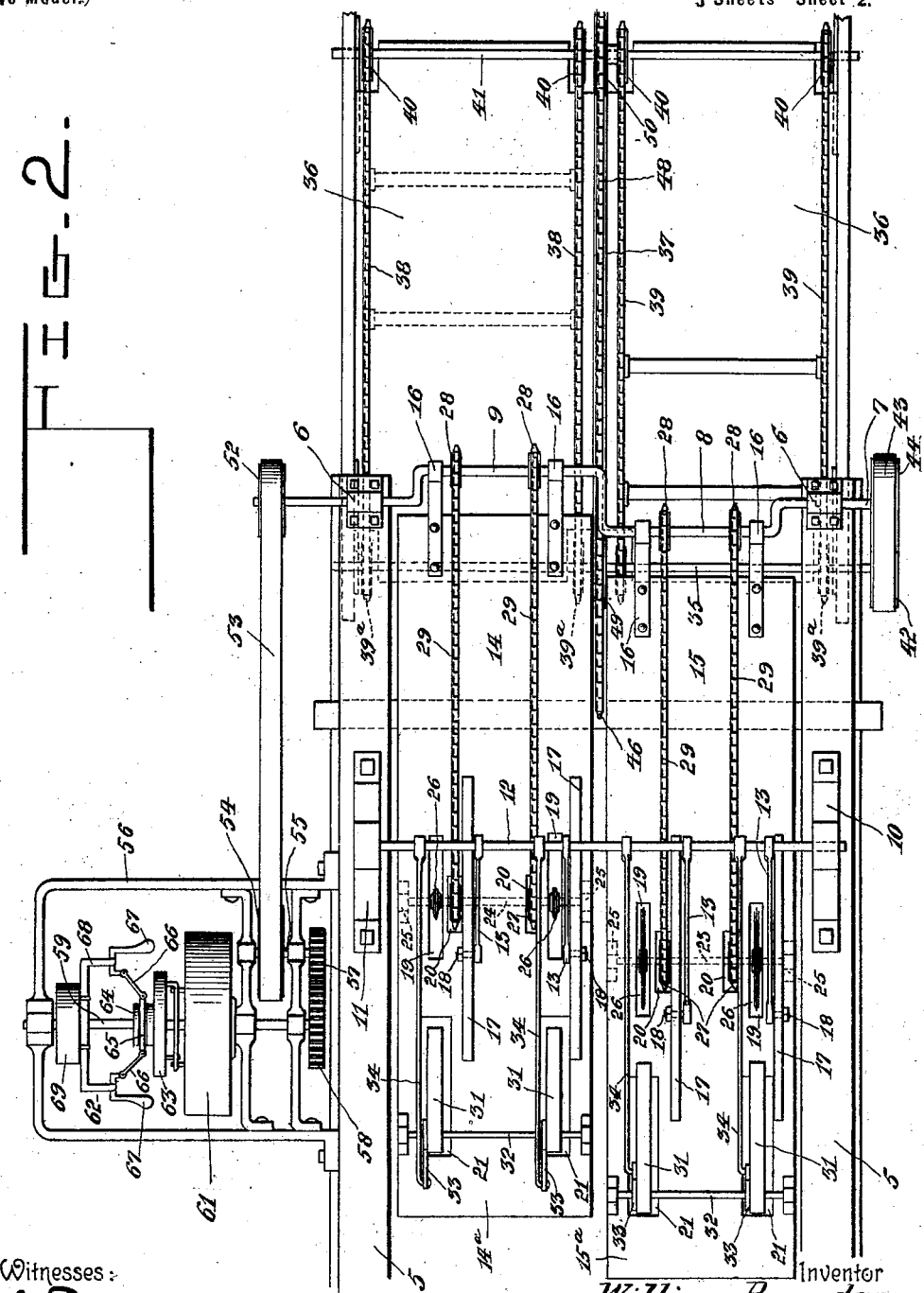

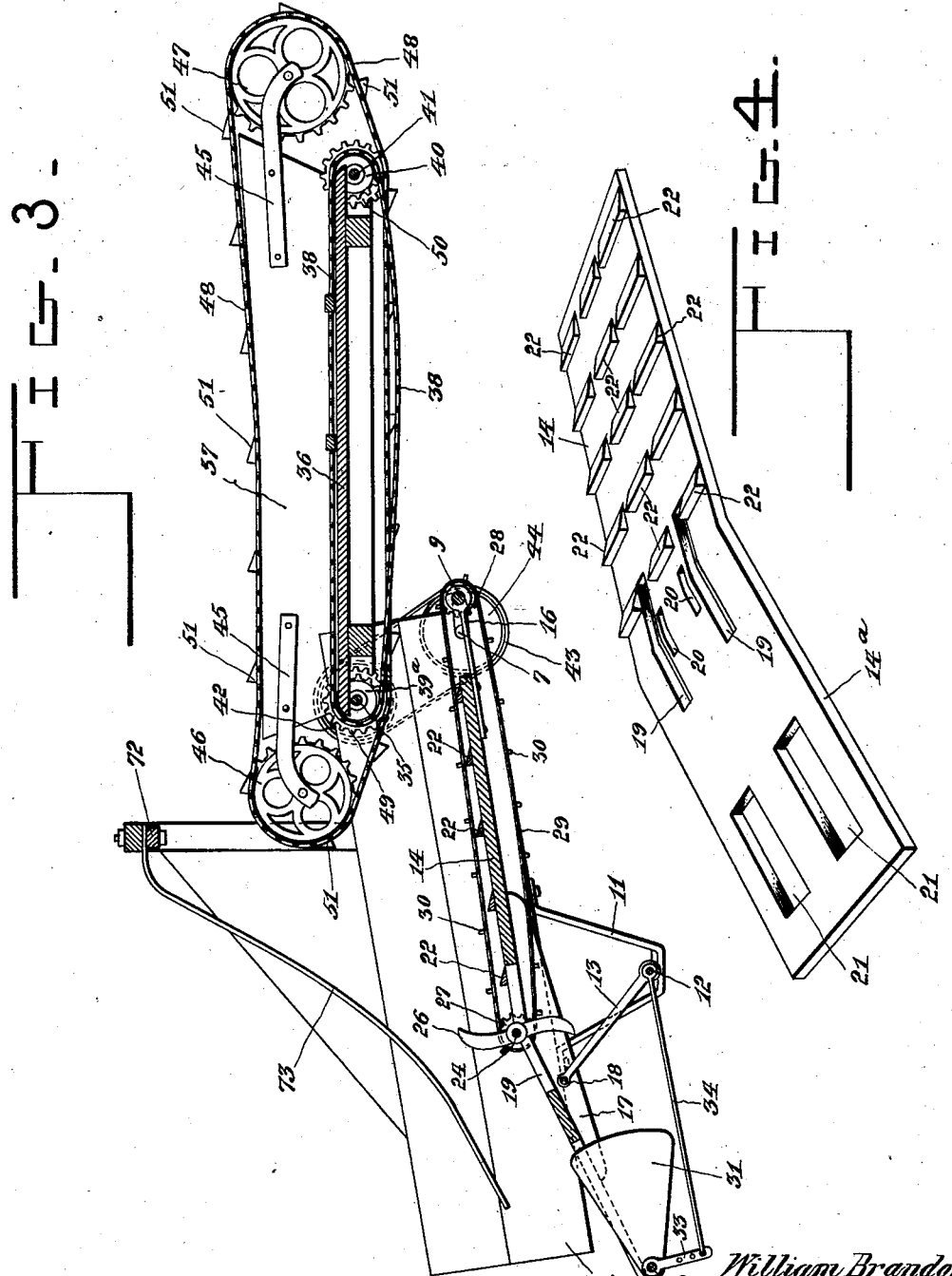

UNITED STATES PATENT OFFICE.

WILLIAM BRANDON, OF KINSMORE, CANADA.

BAND-CUTTER AND FEEDER FOR THRESHING-MACHINES OR GRAIN-SEPARATORS.

SPECIFICATION forming part of Letters Patent No. 699,908, dated May 13, 1902.

Application filed September 13, 1901. Serial No. 75,285. (No model.)

*To all whom it may concern:*

Be it known that I, WILLIAM BRANDON, a subject of the King of Great Britain, residing at Kinsmore, county of Dennis, Province of Manitoba, Canada, have invented certain new and useful Improvements in Band-Cutters and Feeders for Threshing-Machines or Grain-Separators; and I do hereby declare that the following is a full, clear, and exact description of the invention, such as will enable others skilled in the art to which it appertains to make and use the same.

My invention relates to improvements in band-cutters and feeders for threshing-machines or grain-separators of the class disclosed by my prior Canadian patent, No. 67,444; and, among other things, my present invention has in view the provision of an improved primary conveyer mechanism occupying a foldable relation to the feeder mechanism and arranged when in its operative position to transport the grain and to straighten the same before the grain passes to said feeder mechanism; to simplify the construction of the feeder and the cutter mechanism; to provide means for loosening the grain just before it passes to the threshing-machine, and to improve the centrifugally-governed starting mechanism in a way which allows the speed to be varied within certain limits.

To the accomplishment of these ends my invention consists in the novel combination, construction, and arrangement of parts, which will be hereinafter fully described and claimed.

In the drawings hereto annexed, forming a part of this specification, Figure 1 is a top plan view of a band-cutter and feeder embodying my present improvements. Fig. 2 is an inverted or bottom plan view of the mechanism shown by Fig. 1. Fig. 3 is a longitudinal vertical section taken in the irregular plane indicated by the dotted line 3 3 on Fig. 1. Fig. 4 is a detail perspective view of one of the reciprocating feed-boards removed from the feeder mechanism.

The same numerals of reference denote corresponding parts in each of the several figures of the drawings.

5 designates the feeder-frame, which is arranged in a slightly-inclined position, as shown by Fig. 3, and is adapted to be secured by any approved means to a threshing-machine or grain-separator, so as to feed grain directly into the throat thereof in a manner well understood by those skilled in the art. The outer end portion of this feeder-frame is provided with shaft-bearings 6, in which is journaled the main shaft 7, the latter being provided with the wide cranks 8 9, which are bent or otherwise formed to extend in opposite directions.

10 11 designate the stationary hangers, which are secured to the under side of the feeder-frame, as shown by Figs. 2 and 3, and these hangers support the pivotal arbor 12, the same arranged in a horizontal position transversely across and below the feeder-frame 5, and on this arbor are loosely fitted the series of links 13, the purpose of which will presently appear.

14 15 designate the feeder-boards, which are arranged side by side longitudinally of the feeder-frame 5, the same adapted to practically occupy the entire space between the side rails of said feeder-frame. One of the feeder-boards is represented in detail by Fig. 4, by reference to which it will be seen that each feeder-board is provided with an inclined or angular portion at the inner end, which comes next to the throat of the threshing-machine or grain-separator, said angular portion of the feeder-board 14 being indicated at 14$^a$ and the corresponding portion of the feeder-board 15 being indicated at 15$^a$. Each feeder-board is provided at its end with a pair of straps 16, and the straps of the feeder-board 14 are connected with the crank 9 of the main shaft, while the straps 16 of the feeder-board 15 are connected with the same shaft 7 whereby the outer ends of the two feeder-boards are individually supported by the shaft 7, and said feeder-boards are given a positive alternate reciprocation by the cranks 8 9 of said shaft. Each feeder-board is reinforced at the bend or angle portion therein by the series of cleats or battens 17, to which are pivotally connected, at 18, the links 13, as shown by Figs. 2 and 3, whereby the inner portions of the feeder-boards are supported by the links 13, that are connected to the pivotal arbor 12. Furthermore, each feeder-board is provided with two slots 19, which extend across the angular portion thereof and are adapted to receive the band-cutters. They are also provided with the short slots 20, which receive the sprocket-wheels that drive the band-cutter shafts, and the inner angular portion of the feeder-board has the two longitudinal slots 21, that accommodate the kickers, all as will be hereinafter more fully described. Finally, each feeder-board is provided on its upper surface with short ledges 22, the same arranged in rows both longitudinally and transversely of the feeder-board, each ledge having an inclined face and an abrupt shoulder, whereby the grain may be readily advanced in one direction over the feeder-board; but the shoulders of said ledges prevent the grain from falling back in a contrary direction.

23 24 designate the cutter-shafts, which are individually mounted on the feeder-boards 14 15 by the shaft-bearings 25, a pair of said shaft-bearings being secured to each feeder-board on the upper side thereof and in positions for said shafts to extend across the slots 19 20. Each shaft is provided with the knives 26, that are arranged to rotate in the slots 19 of the feeder-board, and, furthermore, each shaft 23 or 24 is provided with the sprocket-wheels 27, the same arranged to work in the slots 20 of the feeder-board.

28 designates the other sprocket-wheels, which are secured to the cranked portions 8 9 of the main shaft 7 in positions to aline with the sprocket-wheels 27 on the cutter-shafts, and these sprocket-wheels 27 28 are connected by the chains 29, having the lugs 30. Said chains are arranged in pairs on the respective feed-boards, so as to travel over the upper active faces thereof and to work between the ledges 22, and said chains are given a traversing motion by the rotation of the shaft 7, whereby the chains transmit the motion of the shaft 7 to the cutter-shafts for rotating said cutters, and they are made to traverse the active surfaces of the feeder-boards, so as to assist in advancing or moving the grain along the feeder-boards.

From the foregoing description it will be seen that the feeder-boards are given a positive reciprocating motion and that the inner ends of said feeder-boards are provided with slots 21, arranged to loosely receive the kickers 31, the same consisting of plates or blocks made approximately in the form of quadrants. Each quadrantal kicker is pivoted at its small end, as at 32, on the under side of the angular inner portion of one feeder-board, and from the kicker or its pivot extends the crank-arm 33, to which is pivoted a pitman 34, having a loose connection with the arbor 12, the latter affording a fixed point of resistance for the pitman. By pivotally connecting the pitman to the reciprocating feeder-board and by providing the kicker with an arm and pitman that are connected with the arbor 12 the motion of the reciprocating feeder-board is adapted to give a rocking motion to the kickers, so that with the feeder-board in the position shown by Fig. 3 the kickers will occupy nearly a flush relation with the feeder-boards; but when the latter is moved to its opposite position the kickers will be forced through the slots in the feeder-boards and made to act against the straw and grain just before the latter is delivered into the threshing-machine, thereby loosening the straw.

I will now proceed to describe the foldable table and the conveyer mechanism which is associated therewith, the same occupying a coöperative relation to the feed mechanism and adapted to convey the bound sheaves from the places where they are tossed indiscriminately upon the table, so as to supply the same to the feed mechanism.

35 designates the conveyer driving-shaft, which is journaled in suitable bearings provided in the upwardly-extending side portions of the feeder-frame 5, and this conveyer driving-shaft serves to support one end of the table 36. Said table extends outwardly from the feeder-frame for a suitable distance, and its outer or free portion is adapted to be sustained by any suitable means—as, for example, by props. The table is divided centrally by means of a longitudinal board or partition 37, and the side portions of this divided table are traversed by the endless conveyers 38 39. Each conveyer consists of two or more chains connected by intermediate slats and driven by the sprocket-wheels 39$^a$, which are made fast with the conveyer driving-shaft 35, the other or rear portions of said slatted conveyers being fitted on and supported by idle sprocket-rollers 40, that are supported by the shaft or rod 41 at the opposite end of the table 36 from the shaft 35. It will be understood that the conveyers are propelled by the sprocket-wheels 39$^a$ on the shaft 35, so that the conveyers will transport the grain which is deposited on the table 36 from the latter to the feed-boards. The delivery of the grain from the table to the feed-boards is assured, because the conveyer mechanism overhangs the feed-boards of the feed mechanism, as shown by Fig. 3. The shaft 35 is provided with a pulley 42, encompassed by a belt 43 and driven by a pulley 44 on the main shaft 7.

45 45 designate supporting-arms, which are secured to the partition 37 and extend beyond the front and rear ends thereof, and in these arms are idly supported the sprocket-wheels 46 47, the same being supported above the horizontal plane of the conveyers 38 39 and beyond the ends of the feed-table. These sprocket-wheels serve to sustain an endless head-carrying conveyer 48, the same extending along the top edge of the partition 37 and under the table and the shafts 35 41. The shaft 35, which it will be remembered is belted to the main shaft 7, is provided with a sprocket-wheel 49, that is somewhat larger than the conveyer driving-sprocket 39$^a$ and is arranged to engage with the chain of the head-carrying conveyer 48, whereby the latter is driven from the shaft 35. The idle shaft 41 is provided with an idle sprocket 50, that also engages with the chain of the head-carrying conveyer 48, the same serving as a guide for said conveyer. The conveyer is provided with the lugs 51 at suitable intervals, and this conveyer is driven at a faster speed than the conveyers 38 39, whereby the head ends of the grain which may lodge against the shoulders 51 of the conveyer 48 are carried toward the feed mechanism at a faster speed than the butt-ends which are advanced by the conveyer 38 or 39, with the result that any improperly-placed grain will be straightened when it is delivered to the feed mechanism by the conveyer.

The grain-table 36 and all the parts associated therewith may be turned to an upright folded position on the axis afforded by the conveyer driving-shaft 35 whenever it is desired to transport the machine.

The main shaft 7 is furthermore provided with a driving-pulley 52, which is encompassed by a belt 53, the latter being driven by a pulley 54 on the short shaft 55. Said shaft is journaled in suitable bearings provided in the framework 56, and to a squared or polygonal end of the shaft is removably secured a spur gear-wheel 57, the latter having intermeshing engagement with a spur gear-wheel 58, which is provided on a shaft 59, also journaled in the framework 56. Said shaft 59 carries a disk or wheel equipped with spring-pressed dogs, as fully disclosed by my prior patent, and on this disk is fitted a pulley 61, which is adapted to be driven by a belt (not shown) from a pulley on the threshing-cylinder shaft. The dogs of the disk or wheel are under the control of a centrifugal starting mechanism 62, which is shown as having a slidable member 63. This starting mechanism is, however, modified by the provision of a collar 64 on the hub of the slidable element 63, with which collar loosely engages a strap 65. To this strap are connected the links 66 of the weighted levers 67, the latter being each loosely fitted in an opening of a plate 68, that is made fast with the pulley 69, which is idly fitted on the shaft 59, the latter supporting the slidable element 63. The pulley 61 is driven from any suitable source of power—as a pulley on the threshing-machine—and when the speed reaches the proper limit the pulley 69 and the weighted levers 67 actuate the element 63, so as to make the wheel or disk and the pulley 61 propel the shaft 59, and thus drive the shaft 55 through the gears 57 58, thereby driving the shaft 7, and consequently all the other operating parts of the improved band-cutting and feeding mechanism. It is evident that the spur gear-wheels 57 58 may easily be removed from the ends of the shafts 55 59, so as to effect a positive variation in the relative speed of said shafts either by the transposition of said wheels or by the substitution of others of the requisite size.

Adjacent to the delivery ends of the conveyers 38, 39, and 48 is an elevated cross-rail 72, which supports a series of curved springs 73, that extend downwardly toward the cutters 26 and are disposed in the path of the grain as it is advanced to the feed mechanism, so that the cutters will properly act thereon.

It is thought that the operation and advantages of my invention will be readily understood from the foregoing description, taken in connection with the drawings.

Changes within the scope of the appended claims may be made in the form and proportion of some of the parts while their essential features are retained and the spirit of the invention is embodied. Hence I do not desire to be limited to the precise form of all the parts as shown, reserving the right to vary therefrom.

I claim—

1. In a band-cutter and feeder, the combination of a cranked shaft, a feeder-board having one end connected with the crank on said shaft and its other end mounted to reciprocate, a sprocket-wheel carried by the crank of the shaft, a second sprocket-wheel carried upon bearings in the feeder-board, endless conveyer-chains passing over both said sprocket-wheels so as to be operated by the revolving motion of the cranked shaft simultaneously with the reciprocation of the feeder-board, and revolving cutter-knives keyed on the shaft of the second sprocket-wheel and operating in slots in said feeder-board.

2. In a band-cutter and feeder, the combination of a double-cranked shaft having its two cranks oppositely disposed upon the axis of the shaft, a pair of feeder-boards, one mounted on each of said cranks, a sprocket-wheel carried by each crank, a second sprocket-wheel mounted on a shaft carried rearwardly of said first sprocket-wheel upon each feeder-board and operating in a slot therein, an endless band or chain passing over each of said sprocket-wheels upon each feeder-board and carrying means for transporting the grain, a series of rotary cutters mounted on the shaft of the rearmost sprocket-wheel in each feeder-board and operated in slots therein, a series of backwardly-directed pointed ledges or serrations on the upper face of each feeder-board, and means for reciprocably supporting the rear end of each feeder-board, whereby the feeder-boards alternate with one another in their back-and-forth movements and the conveyer-chains and cutters are continuously operated.

3. In a band-cutter and feeder, a feeder-board having backwardly-facing serrations or ledges upon its upper surface and a downwardly-bent rear portion, a cranked shaft on which said feeder-board is supported at one end, a pivoted link on which the other end oscillates, a sprocket or band wheel attached to the crank of the shaft, a second parallel shaft carried in bearings on the feeder-board at the bend thereof and close to the face of the feeder-board, a sprocket or band wheel carried thereon, endless chains or conveyer-bands passing over the face of the feeder-board and around said sprocket-wheels and under its rear side through slots thereof, rotary cutters mounted on said last-mentioned shaft and likewise operating through slots adjacent to the bend in the feeder-board, and means for reciprocably supporting the rear end of the feeder-board as described.

4. In a band-cutter and feeder, a cranked shaft adapted for the application of power, a feeder-board attached at its forward end to the cranked portion of said shaft and having its other end reciprocably mounted, sprocket-wheels carried by the cranked portion of said shaft, a transverse parallel shaft mounted midway of the feeder-board and carrying sprocket-wheels and rotary cutters, each operating through suitable slots in the feeder-board, conveyer-chains passing over said sprocket-wheels and adapted simultaneously to carry forward the grain placed upon said table and to operate said knives to cut the bands, kicker-blades pivoted upon a second transverse shaft rearwardly of said first-mentioned shaft, and means for reciprocating said kicker-blades to open the grain after the operation of the cutter-knives.

5. In a band-cutter and feeder, a cranked shaft adapted for the application of power, a feeder-board attached at its forward end to the cranked portion of said shaft and having its other end reciprocably mounted, sprocket-wheels carried by the cranked portion of said shaft, a transverse parallel shaft mounted midway of the feeder-board and carrying sprocket-wheels and rotary cutters, each operating through suitable slots in the feeder-board, conveyer-chains passing over said sprocket-wheels and adapted simultaneously to carry forward the grain placed upon said table and to operate said cutters to cut the bands, kicker-blades pivoted upon a second transverse shaft rearwardly of said first-mentioned shaft, and a crank-arm mounted on the shaft of said kicker-blades and attached to a stationary point of the apparatus, whereby to operate said kicker-blades on the reciprocation of the feeder-board.

6. In a band-cutter and feeder, a cranked shaft adapted for the application of power, a feeder-board connected by bearings at its forward end to the cranked portion of said shaft and having its opposite end reciprocably mounted, sprocket-wheels carried by the cranked portion of said shaft, a transverse shaft mounted midway of the feeder-board adjacent to its face, sprocket-wheels and rotary cutter-knives mounted on said second shaft and operating in slots in the feeder-board, a chain conveyer passing over said sprocket-wheels and adapted to operate said knives and to be operated by the turning of the cranked shaft, said chain conveyer having its upper reach passing over the face of said feeder-board and its lower reach beneath the same and through the slots therein, and kicker-blades mounted on a transverse shaft rearwardly of said first transverse shaft and adapted to be operated to throw the grain upwardly and rearwardly toward the thresher, substantially as described.

7. In a band-cutter and feeder, a cranked shaft adapted for the application of power, a feeder-board connected by bearings at its forward end to the cranked portion of said shaft and having its opposite end reciprocably mounted, sprocket-wheels carried by the cranked portion of said shaft, a transverse shaft mounted midway of the feeder-board adjacent to its face, sprocket-wheels and rotary cutter-knives mounted on said second shaft and operating in slots in the feeder-board, a chain conveyer passing over said sprocket-wheels and adapted to operate said knives and to be operated by the turning of the cranked shaft, said chain conveyer having its upper reach passing over the face of said feeder-board and its lower reach beneath the same and through the slots therein, a second transverse shaft mounted rearwardly of the first, sector-shaped kicker-blades mounted on said second shaft and projecting forwardly through appropriate slots in the feeder-board, and means connecting said blades with a stationary point of the apparatus, whereby the reciprocation of the feeder-board causes the blades to be thrown up to project the grain upwardly and rearwardly.

8. In a band-cutter and feeder, a cranked shaft adapted for the application of power, a feeder-board having an angular bend intermediate thereof causing the rear portion to be downwardly and rearwardly deflected, bearings connecting the front end of said feeder-board with the cranked portion of said shaft, sprocket-wheels carried by said cranked portion, a transverse shaft journaled on said feeder-board close to the face thereof and adjacent to said angular bend, sprocket-wheels and rotary cutters mounted on said shaft and operating through suitable slots in the feeder-board, endless conveyer belts or chains passing over both series of sprocket-wheels and having their upper reaches close to the face of said board and their lower reaches passing through said slots and around the lower face of said board, and backwardly-facing ridges or serrations projecting from the upper face of said board along the length of the conveyer-chains and at each side thereof.

9. In a band-cutter and feeder, a cranked shaft adapted for the application of power, a feeder-board having an angular bend intermediate thereof causing the rear portion to be downwardly and rearwardly deflected, bearings connecting the front end of said feeder-board with the cranked portion of said shaft, a transverse shaft journaled on said feeder-board close to the face thereof and adjacent to said angular bend, sprocket-wheels and rotary cutters mounted on said shaft and operating through suitable slots in the feeder-board, endless conveyer belts or chains passing over both series of sprocket-wheels and having their upper reaches close to the face of said board and their lower reaches passing through said slots and around the lower face of said board, a transverse rock-shaft journaled upon the lower face of said feeder-board rearwardly of said cutters, sector-shaped kicker-blades mounted on said rock-shaft and projecting forwardly thereof, a crank-arm keyed to said last-mentioned shaft and attached to a stationary point of the apparatus, and a link having a stationary bearing at one end and supporting the feeder-board at the other end so as to permit the latter to oscillate or reciprocate thereon.

10. In a band-cutter and feeder, the combination of a plurality of feeder-boards, a grain-table having a longitudinal partition, a pair of sprocket-wheels for each feeder-board, one at each end of said partition and parallel therewith, a head-conveyer for each feeder-board passing over said sprocket-wheels and having its upper reach passing adjacent to the edge of the partition, and means for operating said conveyer-chain, whereby to push the grain off of the edge of said partition.

11. In a band-cutter and feeder, the combination of a plurality of feeder-boards, a grain-table having a longitudinal partition, idle sprocket-wheels mounted one at each end of the partition and parallel therewith, a head-conveyer for each feeder-board passing over said sprocket-wheels and having its upper reach adjacent to the upper edge of said partition, feeding means on the table for pushing forward the grain, and means for operating the head-conveyer at a different rate of speed from said feeding means, whereby to push the grain from the edge of said partition and throw it onto the table.

12. In a band-cutter and feeder, the combination of a grain-table having feeding means adapted to carry forward the grain thereon, a partition longitudinal thereof, a sprocket-wheel mounted at each end of the partition and in line therewith, an endless conveyer-chain passing over said sprocket-wheels and having its upper reach passing along the top edge of said partition, and means for operating said conveyer-chain at a different speed from the feed mechanism, whereby to push off the grain lodging on said partition.

13. In a band-cutter and feeder, the combination of a grain-table having endless conveyer-belts thereon adapted to push forward the grain, a partition longitudinal thereof and carrying at each end a sprocket-wheel parallel therewith, a head-conveyer carried on said sprocket-wheels and having its upper reach extending along the upper edge of the partition, and means connecting said conveyer-belts with said head-conveyer, whereby said head-conveyer is moved faster than the feeder-blades to push off the grain lodging on the partition.

14. A grain-table for band-cutters and feeder comprising a frame carrying at each end a transverse shaft, small and large sprocket-wheels carried by said shaft, endless conveyer-belts passing over said smaller sprocket-wheels, a longitudinal partition between said conveyer-belts, an idle sprocket-wheel carried at each end thereof and in line therewith, and a head-conveyer carried over said idle sprocket-wheels and adjacent to the upper edge of the partition and having its lower reach engaging said large sprocket-wheels, whereby to drive the head-conveyer at a faster rate than said conveyer-belts.

15. A band-cutter and feeder comprising a crank-shaft adapted for the application of power, a feeder-board connected at its forward end to the cranked portion of said shaft and reciprocably mounted at its rear end and having a downwardly-bent rear portion, sprocket-wheels carried by the cranked portion of said shaft, a transverse shaft mounted intermediate of said feeder-board in the upper face thereof and over the angle of said bend, sprocket-wheels and rotary cutters mounted on said shaft and operating through slots in said feeder-board, conveyer-chains passing over said sprocket-wheels and adapted simultaneously to move forward the grain and to rotate said cutters upon the turning of the said cranked shaft and reciprocate said feeder-board, a rock-shaft journaled upon the under face of said feeder-board transversely of the same, kicker-blades mounted on said rock-shaft and extending forwardly thereof and oscillating through slots in the feeder-board to project the grain upwardly and rearwardly, means connecting said rock-shaft with a stationary point on the apparatus, a grain-table overlapping the forward end of said feeder-board and having a transverse shaft in each end thereof, the rearmost shaft being extended to form pivots for said table, whereby the same may be turned into upright position, differential sprocket-wheels carried by said transverse shafts, endless conveyer-belts mounted on the smaller of said wheels, a longitudinal partition on said grain-table, idle sprocket-wheels carried at each end thereof, a head-conveyer passing around said idle sprocket-wheels and adjacent to the upper side of said head-conveyer, and having its lower reach engaging with the larger of said differential sprocket-wheels, and a stop 72 attached to the frame of the machine, whereby said grain-table may be turned about its rearmost shaft as a pivot and retained in a nearly vertical position, substantially as described.

In witness whereof I have hereunto set my hand in the presence of two witnesses.

WILLIAM BRANDON.

Witnesses:
JAS. H. PANGMAN,
ARCHD. C. CAMPBELL.